United States Patent
Wagner et al.

(10) Patent No.: US 8,739,933 B2
(45) Date of Patent: Jun. 3, 2014

(54) OIL PUMP FOR A REFRIGERATION COMPRESSOR

(75) Inventors: Nilson Wagner, Joinville (BR); Sergio Luiz Magnhoto, Joinville (BR); Joao Manoel Mendes, Joinville (BR)

(73) Assignee: Whirlpool S.A., São Paulo-Sp (BR)

( * ) Notice: Subject to any disclaimer, the term of this patent is extended or adjusted under 35 U.S.C. 154(b) by 70 days.

(21) Appl. No.: 12/863,792

(22) PCT Filed: Jan. 21, 2009

(86) PCT No.: PCT/BR2009/000011
§ 371 (c)(1),
(2), (4) Date: Jul. 21, 2010

(87) PCT Pub. No.: WO2009/092147
PCT Pub. Date: Jul. 30, 2009

(65) Prior Publication Data
US 2010/0287977 A1 Nov. 18, 2010

(30) Foreign Application Priority Data
Jan. 21, 2008 (BR) ..................................... 0800686

(51) Int. Cl.
- F01M 1/00 (2006.01)
- F04B 39/02 (2006.01)
- F01C 1/02 (2006.01)

(52) U.S. Cl.
USPC .............................. 184/26; 417/368; 418/55.6

(58) Field of Classification Search
USPC .................... 184/6.5, 6.6, 6.8, 6.16, 6.18, 26; 417/368, 372, 415; 418/55.6
See application file for complete search history.

(56) References Cited

U.S. PATENT DOCUMENTS

| | | | | |
|---|---|---|---|---|
| 4,091,638 A * | 5/1978 | Mitch | | 62/470 |
| 4,575,320 A * | 3/1986 | Kobayashi et al. | | 418/55.6 |
| 4,702,681 A * | 10/1987 | Inaba et al. | | 418/55.6 |
| 4,901,819 A | 2/1990 | Tamba et al. | | |
| 5,772,411 A * | 6/1998 | Crum et al. | | 417/368 |
| 5,803,718 A * | 9/1998 | Woo | | 417/372 |
| 5,842,420 A * | 12/1998 | Khoo et al. | | 184/6.16 |
| 6,171,090 B1 * | 1/2001 | Hurley | | 418/94 |
| 7,179,069 B2 * | 2/2007 | Grassbaugh | | 418/55.6 |
| 7,632,082 B2 * | 12/2009 | Ogasawara et al. | | 418/99 |
| 2003/0010573 A1 * | 1/2003 | Kueon | | 184/6.16 |
| 2003/0161741 A1 | 8/2003 | Noguchi et al. | | |
| 2005/0115771 A1 * | 6/2005 | Shin | | 184/6.16 |
| 2007/0081908 A1 * | 4/2007 | Nishihara | | 417/415 |

* cited by examiner

*Primary Examiner* — William E Dondero
*Assistant Examiner* — Minh Truong
(74) *Attorney, Agent, or Firm* — Gifford, Krass, Sprinkle, Anderson & Citkowski, P.C.

(57) ABSTRACT

An oil pump is applied to a compressor which comprises a shell (1) inferiorly defining an oil reservoir (3) and carrying: a cylinder block (2) in which is journalled a crankshaft (4) carrying a pump body of the oil pump, said pump body (11) having a lower end (1ib) immersed in the oil (3) and comprising: at least one collecting wall portion (12) eccentric in relation to the axis of rotation of the crankshaft (4) and which is deformed to present at least one open step (13) disposed in a plane secant to a cross section of the pump body (11) in the region of said collecting wall portion (12) and defining an opening (13*a*) for admitting oil to the interior of the pump body (11); and an inner impeller wall portion (14) defining a deflector transversal to the direction of admission of the oil through the open step (13) and which, with the rotation of the pump body (11), impels said oil axially and ascendingly.

11 Claims, 4 Drawing Sheets

OIL PUMP FOR A REFRIGERATION COMPRESSOR

FIELD OF THE INVENTION

The present invention refers to an oil pump for refrigeration compressors of the type which comprises a generally hermetic shell interiorly defining an oil reservoir and internally carrying a cylinder block in which is journalled a crankshaft for driving a refrigerant gas pumping mechanism and in which is affixed an electric motor rotor, the assembly defined by the crankshaft and rotor carrying an oil pump interiorly immersed in the oil reservoir.

BACKGROUND OF THE INVENTION

An important factor for the correct operation of most refrigeration compressors is the adequate lubrication of the components which have a relative movement between each other.

The lubrication is obtained by pumping lubricant oil provided in an oil reservoir defined in the interior of a lower portion of a generally hermetic shell. This oil is pumped until reaching the parts of the compressor presenting relative movement, wherefrom said oil returns to the oil reservoir.

In compressors of the reciprocating type, the vertical crankshaft carries a lubricant oil pump, which conducts said oil to the compressor parts to be lubricated, using the rotation of said crankshaft. In these constructions, the oil is pumped from the oil reservoir by spinning and mechanical dragging.

The most employed concept for oil pumping in compressors is based on the centrifugal effect to carry out the pumping. The centrifugal effect uses the pump rotation speed to generate a centrifugal force in the oil, as described in the patent documents WO93/22557, U.S. Pat. No. 4,478,559, U.S. Pat. No. 4,569,639, U.S. Pat. No. 4,097,185, FR2492471 and JP60-069275.

In these constructions, the oil pump generally presents a pump body and a shaft, one of said parts of pump body and shaft being rotatively stationary in relation to the other part, so as to allow a dragging effect on the oil being suctioned by centrifugal force, resulting from the rotation of the motor, one of said parts being also provided with helical superficial channels, in which the oil is ascendingly dragged.

The solution WO93/22557 presents the pump shaft, externally provided with helical grooves, affixed to the crankshaft, in order to rotate therewith, a tubular sleeve being attached to the electric motor stator by a fixation rod, said tubular sleeve being mounted around the pump shaft with a radial gap.

The solution U.S. Pat. No. 6,450,785 presents the pump shaft externally provided with helical grooves on its outer surface and interiorly attached to the electric motor stator, in order to remain stationary, while the tubular sleeve rotates together with the shaft and the rotor of the electric motor.

The solution object of Brazilian Patent Application PI0604908-7 presents an oil pump in which the tubular sleeve is provided with helical grooves on its inner surface and affixed to the rotor-crankshaft assembly, the pump shaft being attached to one of the parts of stator and shell.

In the document U.S. Pat. No. 4,097,185, the crankshaft interiorly carries a pump shaft comprising only a tubular body provided, in its interior, with an inner impeller blade. This construction presents, as advantages in relation to the other known constructions, a manufacturing economy and a lower tendency to failure. However, such construction requires a higher precision in mounting the impeller blade in the interior of the pump body, also favoring the occurrence of failures.

Another known solution is described in the Japanese patent document JP60-069275 related to an oil pump comprising a tubular body interiorly closed by a flat wall in which are eccentrically provided windows which are cutout, so as to define respective fins which are displaced, by thermal variation of the lubricant oil, between an inoperative position, substantially coplanar to their rotation plane with the pump body, and an operative position, substantially transversal to said rotation plane, to operate as fins acting on the oil mass, directing it inwardly to the pump body through the cutout windows and forcing it ascendingly, by spinning, along the inner wall of the pump body.

Although defining one or more windows which capture oil in the lower end of the pump body, this previous Japanese solution places these cutout windows in a condition in which they do not produce, by themselves, suction of the oil to the interior of the pump body upon the rotation of the latter, requiring the provision of the fins as deflecting elements to direct the oil through said windows. This solution presents a constructive sophistication which raises considerably the production cost of said component. Moreover, the oil admitted in the interior of the pump body is ascendingly pumped, by spinning, requiring the pump body to present an inner construction which produces the ascending pumping force, from the centrifugal force applied to the oil mass by the fins.

OBJECTS OF THE INVENTION

It is an object of the present invention to provide an oil pump for a refrigeration compressor which permits and guarantees, safely and during the whole operational life of the compressor, an adequate pumping of oil to the compressor parts with relative movement, said oil pump presenting a simple and economical construction and mounting without requiring the provision of means for ascendingly centrifugally pumping the oil in the interior of the pump body.

A specific object of the present invention is to provide an oil pump, such as cited above and whose construction and mounting presents low probability of failures and which allows a high efficiency degree in using the rotation of the pump tubular body for ascendingly and axially pumping the oil in the interior of the pump body. These and other objects of the present invention are attained from the provision of an oil pump for a refrigeration compressor of the type which comprises a shell interiorly defining an oil reservoir and carrying: a cylinder block in which is journalled a crankshaft having a lower portion; an electric motor rotor affixed around the lower portion of the crankshaft; an oil pump having a tubular pump body, superiorly mounted to one of the parts of crankshaft and rotor, so as to operationally rotate therewith and having a lower end immersed in the oil reservoir. The pump body comprises: at least one collecting wall portion, immersed in the oil and which is eccentric in relation to the axis of rotation of the crankshaft and deformed to present at least one open step, disposed in a plane secant to a cross section of the pump body, in the region of said collecting wall portion, and defining an opening for admitting oil to the interior of the pump body; and a respective inner impeller wall portion defining a deflector disposed transversally to the direction of admission of the oil through the open step and which, with the operational rotation of the pump body, acts on said oil, impelling it axially and ascendingly.

According to a construction of the present invention, the open step at least partially projects inwardly from the contour of the pump body, by means of an adjacent recess provided in the region of said collecting wall portion, upstream of the open step, considering the direction of the operational rotation of the pump body, the open step and the respective recess being externally limited by the periphery of the pump body in the region of the collecting wall portion in which they are provided.

According to another construction of the invention, the pump body has its lower end closed by a revolution surface with a generatrix selected between a straight line segment and a convex arc, the collecting wall portion being defined in said lower end of the pump body. In a particular variant of this solution, the lower end of the pump body is closed by a semi-spherical surface.

Moreover, according to another construction of the invention, the impeller wall portion is defined by a deformation of a respective wall portion of the pump body.

BRIEF DESCRIPTION OF THE DRAWINGS

The invention will be described below, with reference to the enclosed drawings, given by way of example of an embodiment of the invention and in which.

DESCRIPTION OF THE ILLUSTRATED EMBODIMENT

Figure 1:
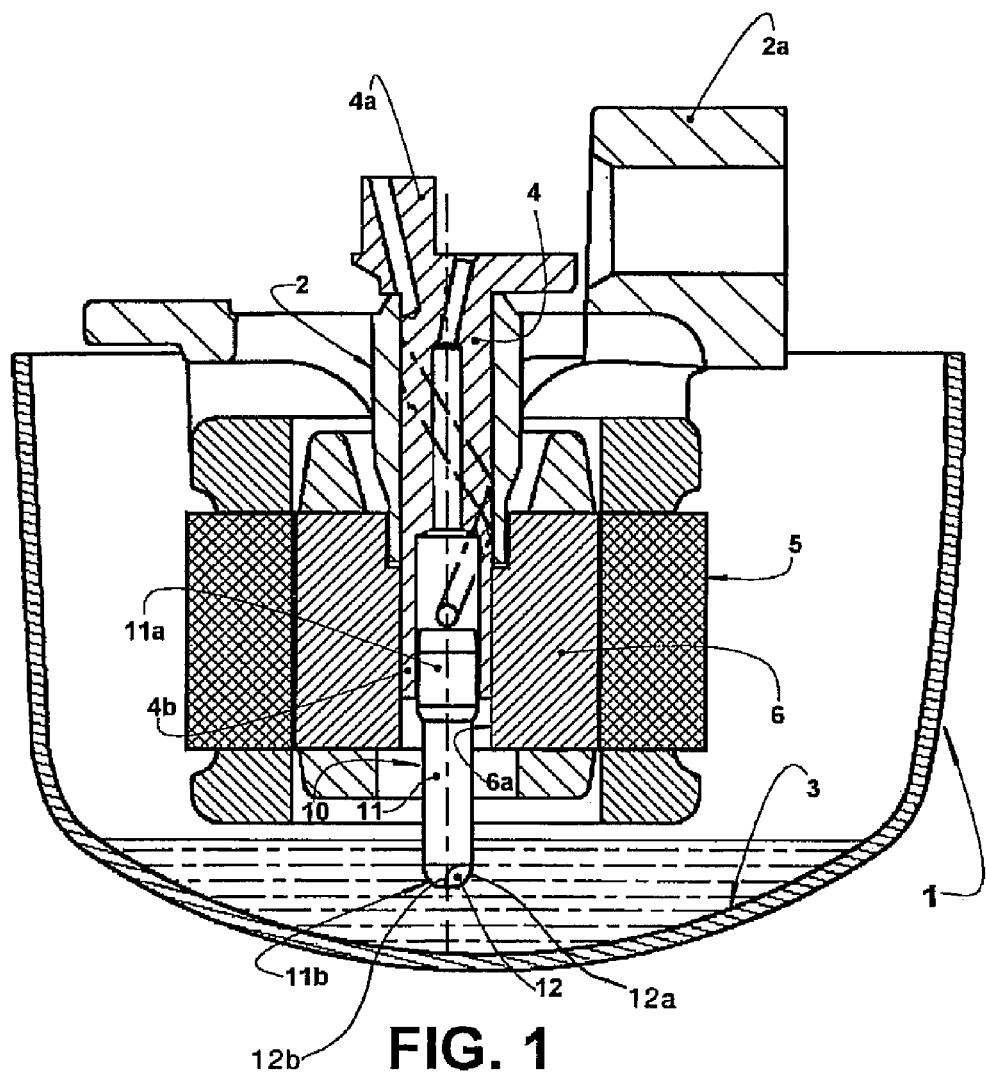
FIG. 1 schematically represents an enlarged longitudinal sectional view of a refrigeration compressor presenting a vertical crankshaft, which interiorly carries an oil pump constructed according to the present invention, a lower end of the oil pump being immersed in an oil reservoir defined in a lower portion of the shell of said compressor.
Figure 2:
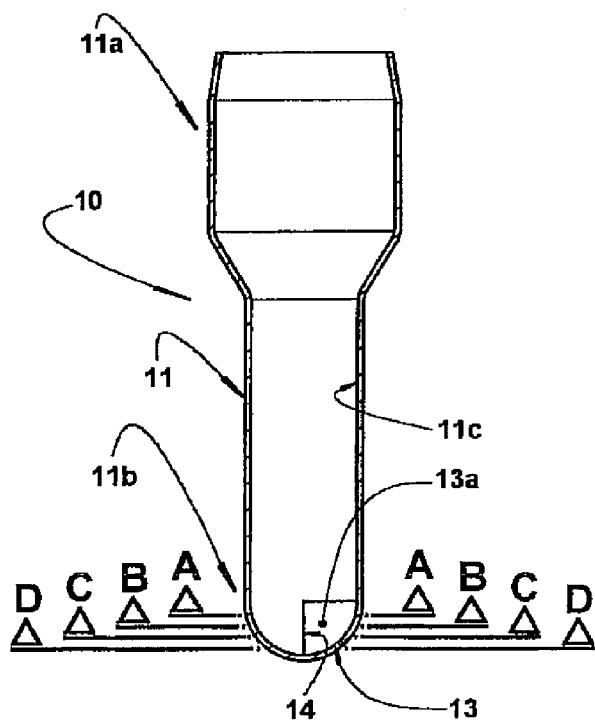
FIG. 2 represents an enlarged longitudinal sectional view of the oil pump illustrated in FIG. 1.
Figure 3:
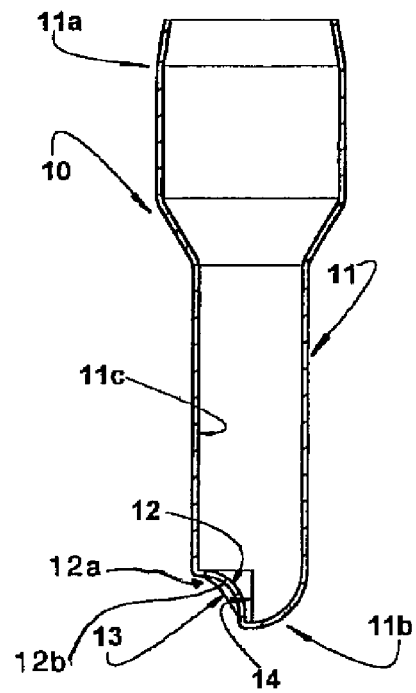
FIG. 3 represents an enlarged longitudinal sectional view of the oil pump illustrated in FIG. 2, but rotated in 90°.
Figure 4:
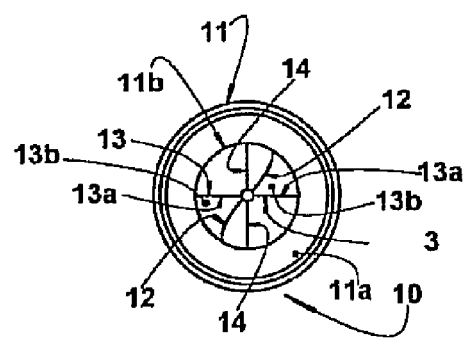
FIG. 4 represents a top plan view of the tubular pump body illustrated in FIGS. 2 and 3.
Figure 5A:
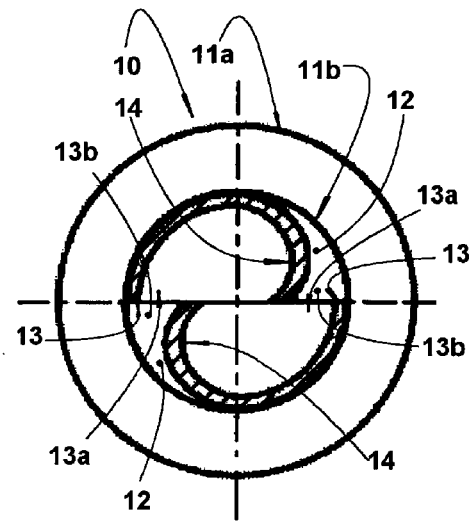
FIGS. 5A, 5B, 5C and 5D represent sectional views of the lower end of the pump body and taken according to lines A-A, B-B, C-C and D-D, respectively, in FIG. 2.
Figure 5B:
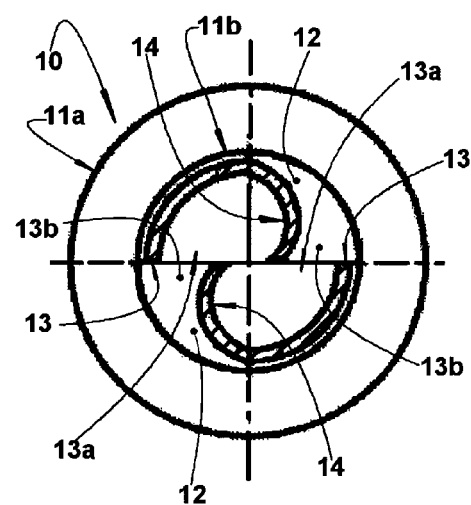
Figure 5C:
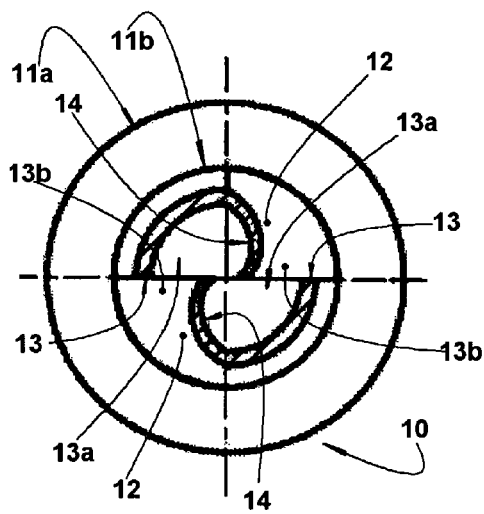
Figure 5D:
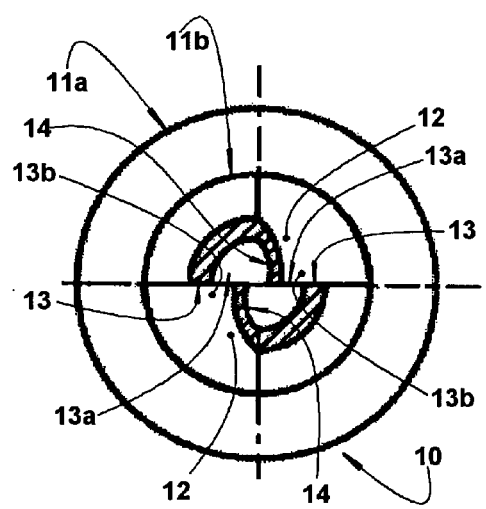
Figure 6:
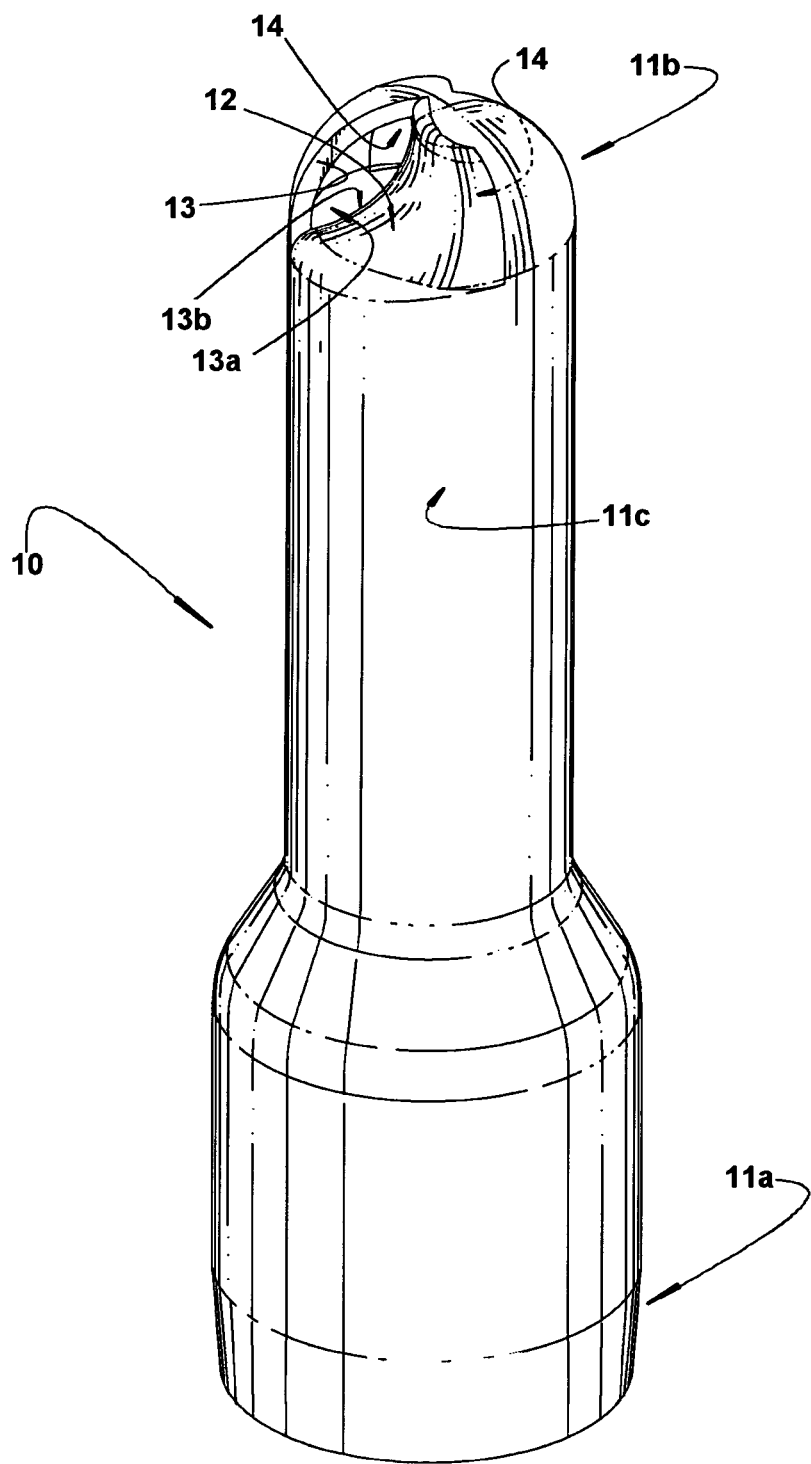
FIG. 6 represents a perspective view of the pump body in an inverted position and illustrating a construction in which each stepped wall portion projects inwardly from the contour of the pump body, in the region in which it is provided.

The present invention will be described for a reciprocating hermetic compressor (for example, of the type applied to a refrigeration system) presenting a generally hermetic shell 1, carrying a cylinder block 2 which defines a cylinder 2a within which actuates a reciprocating piston (not illustrated), in a lower portion of the shell 1 being defined an oil reservoir 3, wherefrom the lubricant oil is pumped, through an oil pump 10, to the movable parts of the compressor.

In the construction described herein, the refrigeration compressor is of the type which is driven by a crankshaft 4, which moves the piston, said crankshaft 4 superiorly presenting an eccentric portion 4a and being medianly journalled to the cylinder block 2 and having a lower portion 4b, which has a tubular form in the illustrated construction and which carries an oil pump 10.

The cylinder block 2 secures a stator 5 of an electric motor, further including a rotor 6 attached to the crankshaft 4, so as to rotate the latter upon operation of the motor, said rotor 6 being, for example, of the type formed by a stack of annular laminations presenting an axial central hole 6a inside which is fitted and affixed the lower portion 4b of the crankshaft 4. Although in the illustrated construction the crankshaft 4 carries the oil pump directly affixed thereto, it should be understood that said crankshaft 4 can carry the oil pump 10 in an indirect form, such as by affixing said oil pump 10 to the rotor 6 of the electric motor. It should be understood that the mounting of the oil pump 10 to the crankshaft 4 or to the rotor 6 does not interfere in the solution object of the present invention.

The oil pump 10 of the present invention presents a tubular pump body 11, having an upper end 11a affixed to one of the parts of crankshaft 4 and rotor 6, and a lower end 11b, immersed in the oil of the oil reservoir 3. In the illustrated construction, the upper end 11a is affixed to the lower portion 4b of the crankshaft 4, particularly through the interior of its lower portion 4b, which is tubular.

The pump body 11 of the oil pump 10 of the present invention comprises: at least one collecting wall portion 12, immersed in the oil, formed by an indent 12a, the indent has a concave surface 12b extending inwardly along the axis of rotation of the crankshaft 4 so as to be eccentric in relation to the axis of rotation of the crankshaft 4 and deformed to present at least one open step 13, disposed in a plane secant to a cross section of the pump body 11, in the region of said collecting wall portion 12, and defining an opening 13a for admitting oil to the interior of the pump body; and a respective inner impeller wall portion 14 defining a deflector disposed transversally to the direction of admission of the oil through the open step 13 and which, with the operational rotation of the pump body 11, acts on said oil, impelling it axially and ascendingly.

According to the present invention, the open step 13 at least partially projects inwardly from the contour of the pump body 11, in the region of the latter in which it is provided, said open step 13 being defined by means of an adjacent recess 13b provided in the region of the collecting wall portion 12 upstream of the open step 13, considering the direction of the operational rotation of the pump body 11. In this construction, the open step 13 and the respective recess 13b are externally limited by the periphery of the pump body 11 in the region of the collecting wall portion 12 in which they are provided.

In the particular illustrated construction, the wall portion of the pump body 11, provided with an open step 13, presents the latter completely projecting inwardly from the contour of said pump body 11. In this construction, the pump body 11 has its lower end 11b closed by a revolution surface with a generatrix defined by a convex arc, the collecting wall portion 12 being defined in said lower end 11b of the pump body 11. However, it should be understood that the lower end 11b can be closed and obtained from a revolution surface with a generatrix selected between a straight line segment and a convex arc, the collecting wall portion 12 being defined in said lower end 11b of the pump body 11. In the case in which the lower end 11b is closed with a revolution surface with a generatrix defined by a straight line segment, said surface defines an end wall, orthogonal to the axis of the pump body 11, and in which the open step 13 is defined.

In the illustrated construction, the pump body 11 presents a cylindrical side wall 11c, and its lower end 11b closed by an end wall in the form of a semi-spherical surface, in which a pair of open steps 13 are provided, opposite to one another, each defined by a recess 13b of the end wall, projecting to the interior of the contour of the pump body 11, said recess 13b internally defining an impeller wall 14 for the oil which enters through the open step 13.

In a way of carrying out the present invention, the pump body 11 is obtained by progressive draw stamping, for example, cold laminated steel adequate for such stamping. The semi-spherical lower end 11b is submitted to a pair of diametrically opposite radial cutouts, provided from a non sectioned central region, coincident with the axis of the pump body 11. Each radial cutout region has part of the semi-spherical surface lowered, from the cutting plane of the semi-spherical surface, defining an open step 13, a respective recess 13b and a respective impeller wall portion 14, such as above described. Each open step 13 is defined so that the respective opening 13a is turned to the oil mass, in the direction of the relative rotation of the oil towards each opening 13a of an open step 13.

In another way of carrying out the present invention, the oil pump 10 is obtained in a plastic material, with an appropriate form already defining the open steps 13.

With the rotation of the assembly defined by the crankshaft 4 and rotor 6, the oil pump 10 also rotates, forcing the admission of oil through the opening 13a formed by each open step 13. As the oil enters through the opening 13a of an open step 13, its speed raises and said oil is thrown against the impeller wall portion 14, reducing the slide between the oil film and the inner surface of the pump body 11. The oil is thrown tangentially and forced to ascend through the inner wall of the pump body 11, reaching a conventional oil channel provided in the pump body and which allows the oil to reach the compressor parts with relative movement. In the particular illustrated form, the upper end 11a of the pump body 11 is mounted and affixed, by being press-fit through the interior of the tubular lower portion 4b of the crankshaft 4.

In a way of carrying out the present invention, the pump body 11 is cylindrical from the semi-spherical surface portion which defines the lower end 11b of the oil pump 10 and superiorly presents an enlarged cylindrical tubular portion, defining the upper end 11a of the pump body 11. In a preferred and illustrated constructive option, the pump body 11 is conical from its lower end 11b, until a region that ends at that provided with an enlargement and described above. The conical surface permits, internally to the pump body 11, an increase of the ascending dragging speed, by centrifugal force, of the oil thrown, by the impact against the impeller wall portion 14.

It should be also understood that the open step 13 can be provided in a side wall 11c of the pump body 11, at least partially projecting to the interior of the contour of said pump body 11, provided that said side wall portion is submersed in the lubricant oil of the oil reservoir 3, so as to carry out the desired oil pumping. The open step 13, in any of the surfaces in which it can be provided, can completely project outwardly from the contour of the pump body 11, provided that said projection does not interfere with the dimensions available in the interior of the compressor, particularly in the mounting region of the oil pump 10 to one of the parts of rotor 6 and crankshaft 4.

Although not illustrated, the pump body 11 can comprise a plurality of open steps 13, angularly and circumferentially spaced apart, on the wall of the pump body 11 in which they are provided, each at least partially projecting inwardly from the contour of the pump body 11, by means of an adjacent recess 13b provided in the region of said collecting wall portion 12, upstream of the respective open step 13, considering the direction of the operational rotation of the pump body 11.

While the concept presented herein has been described considering mainly the construction illustrated of lower end 11b presenting a pair of open steps 13, it should be understood that this particular construction does not imply any restriction to the other possible combinations within the most generic concept exhibited herein. What is intended to protect herein is the principle and not the specific application or particular constructive form.

The invention claimed is:

1. A refrigeration compressor comprising a shell interiorly defining an oil reservoir and carrying: a cylinder block in which is journalled a crankshaft having a lower portion; an electric motor rotor affixed around the lower portion of the crankshaft; an oil pump having a tubular pump body, mounted to said crankshaft and rotor, so as to operationally rotate therewith and having a lower end immersed in the oil reservoir, wherein the tubular pump body having an interior and comprising at least one collecting wall portion, a portion of the at least one collecting wall being immersed in oil, the at least one collecting wall portion formed by an indent, the indent having a concave surface extending inwardly along the axis of rotation of the crankshaft so as to be eccentric in relation to the axis of rotation of the crankshaft and defining an opening adjacent a distal end of the tubular pump body, the opening for admitting the oil to the interior of the pump body, wherein the collecting wall portion includes at least one open step, disposed in a plane secant to a cross section of the tubular pump body, in the region of said collecting wall portion, and a respective inner impeller wall portion defining a deflector disposed transversally to the direction of admission of the oil through the open step and which, with the operational rotation of the tubular pump body, acts on said oil, impelling the oil axially and ascendingly, the distal end of the tubular pump body is closed by a revolution surface with a generatrix selected between a straight line segment and a convex arc, the at least one collecting wall portion being defined within said lower end of the tubular pump body.

2. A refrigeration compressor as set forth in claim 1, characterized in that the open step at least partially projects inwardly from said tubular pump body, by means of a recess, provided adjacent said collecting wall portion, upstream of the open step, considering the direction of the operational rotation of the tubular pump body.

3. A refrigeration compressor as set forth in claim 1, characterized in that the open step and the respective recess are externally limited by the tubular pump body in the region of the collecting wall portion in which the open step and the recess are provided.

4. A refrigeration compressor as set forth in claim 1, characterized in that the open step at least partially projects inwardly from said tubular pump body, by means of a recess provided adjacent said collecting wall portion, upstream of the open step, considering the direction of the operational rotation of the tubular pump body.

5. A refrigeration compressor as set forth in claim 1, characterized in that the open step and the respective recess are externally limited by the tubular pump body in the region of the collecting wall portion in which they are provided.

6. A refrigeration compressor as set forth in claim 1, characterized in that the lower end of the tubular pump body is closed by a semi-spherical surface.

7. A refrigeration compressor as set forth in claim 1, characterized in that the impeller wall portion is defined by a deformation of a respective wall portion of the tubular pump body.

8. A refrigeration compressor as set forth in claim 1, characterized in that the tubular pump body comprises a plurality of open steps, angularly and circumferentially spaced apart, each at least partially projecting inwardly from the tubular pump body, by means of an adjacent recess provided in the region of said collecting wall portion, upstream of the respective open step, considering the direction of the operational rotation of the tubular pump body, the recess, disposed upstream of each respective open step, the recess and the wall portion of the tubular pump body defining the impeller wall portion of another of the plurality of open steps disposed immediately upstream.

9. A refrigeration compressor as set forth in claim 8, characterized in that each recess which defines an impeller wall portion, is defined by a deformation of a respective wall portion of the tubular pump body.

10. A refrigeration compressor as set forth in claim 9, characterized in that the open step and the respective recess are externally limited by the tubular pump body in the region of the collecting wall portion in which they are provided.

11. A refrigeration compressor as set forth in claim 10, characterized in that the lower end of the tubular pump body is closed by a semi-spherical surface.

* * * * *